(12) United States Patent
Osborne et al.

(10) Patent No.: US 8,158,291 B2
(45) Date of Patent: Apr. 17, 2012

(54) HYDROGEN RECIRCULATION SYSTEM USING INTEGRATED MOTOR GENERATOR ENERGY

(75) Inventors: Kurt David Osborne, Dearborn, MI (US); Keith Andrew Oglesby, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 511 days.

(21) Appl. No.: 11/949,211

(22) Filed: Dec. 3, 2007

(65) Prior Publication Data

US 2009/0142644 A1    Jun. 4, 2009

(51) Int. Cl.
*H01M 8/04* (2006.01)
*F03B 3/00* (2006.01)
*F03B 13/00* (2006.01)
*H02P 9/04* (2006.01)

(52) U.S. Cl. .......... 429/415; 429/408; 429/512; 290/52; 60/410; 60/436

(58) Field of Classification Search .................. 429/408, 429/415, 512; 290/52; 60/410, 436
See application file for complete search history.

(56) References Cited

U.S. PATENT DOCUMENTS

| | | | |
|---|---|---|---|
| 6,338,912 | B1 | 1/2002 | Ban et al. |
| 6,628,006 | B2 | 9/2003 | Oglesby et al. |
| 6,977,119 | B2 | 12/2005 | McElroy |
| 2002/0150801 | A1 | 10/2002 | Yang |
| 2005/0147853 | A1 | 7/2005 | Kaufmann et al. |
| 2005/0147863 | A1 | 7/2005 | Hiramatsu et al. |
| 2005/0266293 | A1 | 12/2005 | Delzanno et al. |

*Primary Examiner* — Patrick Joseph Ryan
*Assistant Examiner* — Ladan Mohaddes
(74) *Attorney, Agent, or Firm* — Brooks Kushman P.C.

(57) ABSTRACT

A system for delivering a supply fluid stream to a fuel cell stack that discharges an unused fluid stream is provided. A fuel supply is adapted to provide a pressurized supply fluid stream. An expander is in fluid communication with the fuel supply and is configured to receive the pressurized supply fluid stream to reduce the pressure of the pressurized supply fluid stream and to generate mechanical energy in response to reducing the pressure of the pressurized supply fluid stream. An electric machine is operably coupled to the expander and for selectively converting the mechanical energy generated by the expander into electrical energy. A compressor/blower is capable of being driven by at least one of the mechanical energy and the electrical energy to control the flow of the unused fluid stream to the fuel cell stack for recirculating the unused fluid stream back to the fuel cell stack.

13 Claims, 3 Drawing Sheets

HYDROGEN RECIRCULATION SYSTEM USING INTEGRATED MOTOR GENERATOR ENERGY

BACKGROUND

1. Technical Field

The embodiments of the present invention described herein generally relate to a system for hydrogen recirculation using integrated motor/generator energy.

2. Background Art

It is generally well known that a number of fuel cells are joined together to form a fuel cell stack. Such a stack generally provides electrical current in response to electrochemically converting hydrogen and oxygen into water and energy. The electrical current is used to provide power for various electrical devices in the vehicle. A supply (or fuel tank) generally provides hydrogen to the fuel cell stack. The fuel cell stack may use less hydrogen than provided by the supply to generate electrical power. The excess or unused hydrogen is discharged from the fuel cell stack and recirculated with the supply hydrogen and sent back to the fuel cell stack. A blower/compressor may be used to combine the unused hydrogen discharged from the fuel cell stack with the supply hydrogen to sustain a desired flow of hydrogen to the fuel cell stack. The recirculation of such unused hydrogen may improve fuel efficiency and stability.

The amount of flow of hydrogen that is passed through the fuel cell stack and needed to produce electrical current fluctuates based on vehicle level power consumption and vehicle operating attributes. In a high power consumption mode, the flow of the hydrogen through the fuel cell stack is generally high since the fuel cell stack has to consume more hydrogen at a relatively faster rate in order to meet higher power demands for the vehicle.

During a low power consumption mode, it may be necessary to increase the flow of the hydrogen through the fuel cell stack since the fuel cell stack consumes and discharges unused hydrogen at a relatively slower flow rate. Such a slow flow rate of hydrogen may affect the life span of the fuel cell stack and affect the production of electrical power thereby leading to operational inefficiencies.

While the blower/compressor is particularly useful for recirculating unused hydrogen back to the fuel cell during low and high power consumption modes in order to meet desired hydrogen flow rates, the blower/compressor generally consumes a large amount of power from the power supply of the vehicle to operate. Particularly, in the low power consumption mode since the blower/compressor has to increase the flow of the unused hydrogen back to the fuel cell stack to compensate for the reduced flow of unused hydrogen discharged from the fuel cell stack.

Accordingly, it would be useful to provide an alternative power source which produces electrical or mechanical power that may be used to drive the blower/compressor in order to minimize power consumption during various fuel cell stack operational modes. In addition, it would be useful to store excess power generated by the alternative power source in moments where the blower/compressor operates in a limited capacity or in no capacity at all so that other power consuming devices in the vehicle may consume the stored excess power.

SUMMARY

In one embodiment, a system for delivering a supply fluid stream to a fuel cell stack that discharges an unused fluid stream and recirculates the unused fluid stream to the fuel cell stack by controlling the flow rate of the unused fluid stream is provided. The system comprises a fuel supply, an expander, an electric machine, and a compressor/blower. The fuel supply is adapted to provide a pressurized supply fluid stream. The expander is in fluid communication with the fuel supply and is configured to receive the pressurized supply fluid stream to reduce the pressure of the pressurized supply fluid stream and to generate mechanical energy in response to reducing the pressure of the pressurized supply fluid stream. The electric machine is operably coupled to the expander for selectively converting the mechanical energy generated by the expander into electrical energy. The compressor/blower is capable of being driven by at least one of the mechanical energy and the electrical energy to control the flow of the unused fluid stream to the fuel cell stack for recirculating the unused fluid stream back to the fuel cell stack.

DETAILED DESCRIPTION OF THE PREFERRED EMBODIMENT(S)

Figure 1:
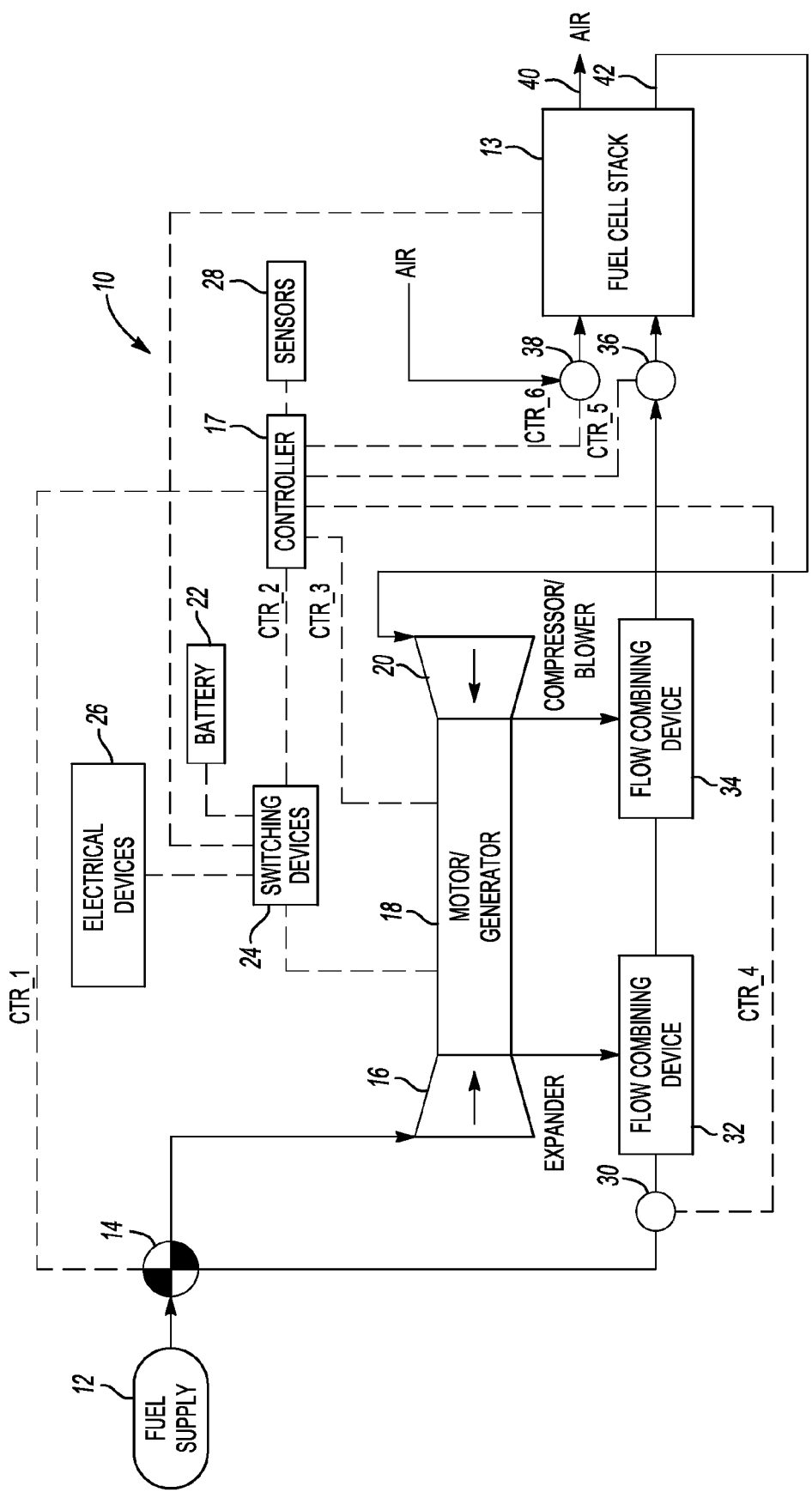
FIG. 1 depicts a first recirculation system in accordance to one embodiment of the present invention.

FIG. 1 depicts a first recirculation system 10 in a vehicle in accordance to one embodiment of the present invention. The system 10 includes a fuel supply 12 adapted to store and deliver supply hydrogen at high pressure. A fuel cell stack 13 is adapted to receive the hydrogen along with oxygen from an air stream to electrochemically convert hydrogen and oxygen into water and energy (electrical current). Such energy is used to provide power for the vehicle.

A valve 14 is in fluid communication with the fuel supply 12 to control the flow of hydrogen to the fuel cell stack 13. The valve 14 may be implemented as a solenoid valve. A controller 17 is operably coupled to the valve 14 via control signal CTRL_1 to control the valve 14 (e.g., to open/close) based on the desired amount of hydrogen that is needed to pass into the system 10. The controller 17 may be implemented as part of the engine control unit (ECU) or within other such suitably adapted control units disposed within the vehicle. The controller 17 may also be implemented as a standalone control unit.

An expander 16 is coupled to the valve 14. The expander 16 is driven by the pressurized hydrogen and is adapted to reduce the pressure of the hydrogen entering the system 10. The expander 16 is implemented as a turbine and is rotatably driven by the pressurized hydrogen gas. The expander 16 generates torque in response to the energy derived by reducing the pressurized hydrogen. A motor/generator 18 is coupled to the expander 16 via a first shaft (not shown) and is capable of generating electrical power from mechanical torque (e.g., torque generated by the expander 16) or generating torque from electrical power.

A compressor/blower 20 is coupled to the motor/generator 18 via the first shaft. The first shaft extends from the expander 16 through the motor/generator 18 and to the compressor/blower 20, thereby coupling the expander 16, the motor/generator 18 and the compressor/blower 20 together. Additional coupling embodiments will be discussed in more detail in connection with FIGS. 2-3. The compressor/blower 20 generally recirculates unused hydrogen discharged from the fuel cell stack 13 with supply hydrogen provided by the fuel supply 12 to improve fuel efficiency.

With the expander 16 and the compressor/blower 20 being mechanically coupled together, the rotation produced by the expander 16 (via the reduction in pressure of the supply hydrogen) may be used to drive the compressor/blower 20. Such rotation may be used by the motor/generator 18 to generate electrical power. The motor/generator 18 is capable of operating in an electrical power-generating mode. In the electrical power-generating mode, the motor/generator 18 receives torque from the expander 16 as the expander 16 rotates and converts a portion of the torque into electrical energy. The remainder of the torque may be used to drive the compressor/blower 20.

A battery 22 is electrically coupled to the motor/generator 18 via switching device 24 to store electrical power as the motor/generator 18 operates in the electrical power-generating mode. Switching device 24 is controlled via control signal CTR_2 by the controller 17. The switching device 24 facilitates the delivery of power from the motor/generator 18 to the battery 22 for storage when the motor/generator 18 is in the electrical power-generating mode. Electrical devices 26 may be coupled to the motor/generator 18 while in the electrical power-generating mode for receiving electrical power from the motor/generator 18 via the switching device 24. The switching device 24 may be a integrated within the controller 17 or may be implemented as a standalone device. The switching device 24 may comprise transistors, relays or other suitable contact switches which are responsive to the control signal CTR_2. The particular type of switching device used may vary based on the desired criteria of a particular implementation.

The motor/generator 18 is also capable of operating in a torque-producing mode whereby the motor/generator 18 receives electrical power from the battery 22 or the fuel cell stack 13 and produces torque in response to the electrical power. The switching device 24 facilitates the delivery of power from the battery 22 and/or the fuel cell stack (or other such power generating devices disposed in the vehicle) to the motor/generator 18 when the motor/generator 18 is in the torque-producing mode. A plurality of sensors 28 are electrically coupled to the controller 17 for measuring vehicle operating characteristics, the pressure of the hydrogen within various locations in the system 10 (e.g., pressure of the supply hydrogen in the fuel supply 12, pressure of unused hydrogen in the fuel cell stack 13), vehicle speed, the amount of torque delivered from the expander 16 to the motor/generator 18, the amount of fuel remaining in the fuel supply 12 and/or the state of charge of the battery 22. The sensors 28 transmit such data to the controller 17. The motor/generator 18 is electrically coupled to the controller 17 via control signal CTR_3. The controller 17 may control the motor/generator 18 to switch from the electrical power-generating mode to the torque producing mode, or vice-versa.

A first pressure regulator 30 is fluidly coupled to the valve 14. The first pressure regulator 30 may reduce the pressure of the supply hydrogen delivered from the valve 14. The first pressure regulator 30 is responsive to the controller 17 via control signal CTR_4.

A first flow combining device 32 is coupled to an output of the first pressure regulator 30 and an output of the expander 16. The first flow combining device 32 combines the hydrogen from the expander 16 and the first pressure regulator 30. A second flow-combining device 34 is coupled to an output of the first flow-combining device 32 and an output of the compressor/blower 20. The second flow-combining device 34 is adapted to combine the flow of unused hydrogen received from the compressor/blower 20 with the supply hydrogen received from the first flow combining device 32. The second flow-combining device 34 combines the supply hydrogen with the unused hydrogen to produce input hydrogen. The first and second flow-combining devices 32, 34 may be implemented as Y-pipe, jet pump, Coanda device or other suitable devices.

While the system 10 generally includes the pressure regulator 30 and the first flow-combining device 32, additional implementations may not need the pressure regulator 30 and the first flow-combining device 32. Such an implementation may be easier to implement and generally depends on the operating demands on the system, which are generally dependent on the vehicle duty cycle. It may be possible to implement the system 10 without the use of the pressure regulator 30 and the first flow-combining device 32 if the operating range of the system 10 is reduced by limiting the low power operating point.

A second pressure regulator 36 is coupled to an output of the second flow combining device 34. The second pressure regulator 36 regulates the flow of the input hydrogen into the fuel cell stack 13. The second pressure regulator 36 is responsive to the controller 17 via control signal CTR_5. While the system 10 generally includes the second pressure regulator 36, additional fuel cell implementations may not need the second pressure regulator 36. In general, the second pressure regulator 36 may or not be implemented and the choice to include the second pressure regulator 36 may be based on the desired criteria of a particular implementation.

A third pressure regulator 38 is adapted to control the flow of air entering the fuel cell stack 13. The third pressure regulator 38 controls the flow of air in response to the controller 17 via control signal CTR_6. The fuel cell stack 13 includes a first outlet 40 for discharging unused air and a second outlet 42 for discharging the unused hydrogen. The controller 17 is adapted to control the flow of air and the input hydrogen into the fuel cell stack 13 based on vehicle operating characteristics and/or pressure readings of the supply hydrogen and the unused hydrogen discharged from the fuel cell stack 13 detected and transmitted by the sensors 28. The pressure readings of the supply hydrogen in the fuel supply 12 are generally indicative of the amount of potential energy that may be converted by the expander 16 to produce mechanical and/or electrical energy. The system 10 may be implemented without the second pressure regulator 36. For a number of systems, the function provided by the third pressure regulator 38 may be achieved by controlling the speed of a compressor (not shown) for the airstream and/or by controlling a throttle valve (not shown) positioned downstream of the stack air outlet 40.

The fuel supply 12 is generally adapted to provide the supply hydrogen at a high pressure, or at a pressure that is greater than a predetermined pressure rate that is needed to ensure a proper pressure level for optimal performance of the fuel cell stack 13. The supply hydrogen is at a high pressure when the fuel supply 12 is substantially or completely filled. In general, when the vehicle is operated, preferably, the pressure of the supply hydrogen should be reduced prior to being delivered to the fuel cell stack 13. The expander 16 is adapted to reduce the pressure of the supply hydrogen prior to the fuel cell stack 13 receiving the hydrogen. The controller 17 transmits the control signal CTR_1 to the valve 14 so that the valve 14 allows the pressurized supply hydrogen to be passed to the expander 16. The expander 16 allows the pressurized supply hydrogen to pass therethrough to reduce the pressure of the supply hydrogen, generate torque, drive the compressor/blower 20 with the torque and generate electrical power across the motor/generator 18. In response to the pressurized supply hydrogen passing through the expander 16, the potential energy associated with the high pressure of the supply hydrogen is captured and converted into mechanical and/or electrical energy. The controller 17 may control the amount of electrical energy generated by the motor/generator 18 with the control signal CTR_3.

In a first mode, the controller 17 determines that all of the potential energy that may be derived by expanding the supply hydrogen (with the expander 16) may be converted into the mechanical energy to drive the compressor/blower 20. The controller 17 may disable the motor/generator 18 via the signal CTR_3 and allow the compressor/blower 20 to be driven solely by the torque generated by the expander 16 to control the flow rate of the unused hydrogen to/from the fuel cell stack 13. The controller 17 may make such a determination in response to signals from the sensors 28. For example, the sensor 28 may include current sensors for measuring the current output generated by the fuel cell stack 13. The controller 17 may determine if the load is high or low based on the current measurements of the output current produced by the fuel cell stack 13. The sensor 28 may also include various speed sensors positioned about shafts of the expander 16, the compressor/blower 20 and/or the motor (or generator). Such speed sensors may provide information related to the amount of hydrogen that is recirculated by measuring a differential flow of hydrogen in the system 10 between the flow of hydrogen into the expander 16 and the flow of hydrogen out of the blower/compressor 20. The controller 17 may compare the measured amount of hydrogen that is recirculated in the system 10 to an empirically-mapped circulation flow. Alternatively, the flow of hydrogen into the expander 16 (e.g., combined with various properties of the turbines positioned on the expander 16 and the compressor/blower 20) or the flow of hydrogen out of the blower may be used to determine if there is an appropriate amount of hydrogen being recirculated in the system 10. In general, the flow rate of the recirculated hydrogen may not be measured directly. The flow of the recirculated hydrogen may be measured based on the pressure differential or an empirically-derived map as discussed above.

In one example, it may be necessary to increase the flow rate of the unused hydrogen discharged from the fuel cell stack 13 when the vehicle is in a low power consumption mode and the fuel supply 12 may be completely or substantially full. In the low power consumption mode, the fuel cell stack 13 may not be consuming a large amount of input hydrogen. The stack 13 may discharge the unused hydrogen from the outlet 42 at a very slow rate in response to low hydrogen consumption. To increase the flow rate of the unused hydrogen, the expander 16 reduces the high pressure of the supply hydrogen and generates mechanical energy (e.g., torque) to drive the compressor/blower 20. The compressor/blower 20 increases the flow rate of the unused hydrogen to/from the fuel cell stack 13. In such an example, the controller 17 controls the generator 18 via signal CTR_3 such that no electrical power is generated since mechanical energy is needed for the first mode.

In a second mode, the controller 17 may determine that more potential energy is available due to the expansion of the supply hydrogen with the expander 16 than is needed to drive the compressor/blower 20. In such a case, the expander 16 reduces the pressure of the supply hydrogen and generates torque in response to the reduction of the pressure. The torque is used to drive the compressor/blower 20 and to generate electrical energy. The electrical energy may be stored in the battery 22 or consumed by the electrical devices 26. The controller 17 controls the motor/generator 18 to operate in the electrical generating mode. Such a condition may be representative of when the fuel supply 12 is substantially or completely full and when the vehicle is in a high power consumption mode. Since the fuel cell stack 13 may be consuming input hydrogen at an increased rate, the available energy derived from reducing the pressure of the supply hydrogen in the expander 16 may increase substantially. In this case, more potential energy may be available than what is needed to drive the compressor/blower 20.

The controller 17 may determine if the system 10 is in the second mode based on data collected by the sensors 28. In the second mode, the controller 17 may control the switching device 24 to allow electrical power generated by the generator 18 to pass to the battery 22 or to the electrical devices 26. The controller 17 may also allow a portion of the electrical energy generated to be consumed by the electrical devices 26 and the remaining portion to be stored on the battery 22 simultaneously by controlling the switching device 24 to allow for the electrical power to pass to the battery 22 and the electrical devices 26.

As the vehicle is driven and the supply hydrogen is depleted, the pressure of the supply hydrogen in the fuel supply 12 and the rest of the hydrogen in the system 10 decreases. In a third mode, the controller 17 may determine that less potential energy may be available after the expansion of the supply hydrogen with the expander 16 than the amount of energy that may be needed to drive the compressor/blower 20. In such a case, energy is provided by the vehicle thereby causing the compressor/blower 20 to consume power from the battery 22 or the fuel cell stack 13. The controller 17 controls the motor/generator 18 to operate in the torque generating mode. As such, the compressor/blower 20 generates torque in response to electrical power stored in the battery 22. The switching device 24 acts in response to the signal CTR_2 for allowing the motor 18 to consume electrical power from the battery 22 or the fuel cell stack 13.

While in the third mode, the supply hydrogen may be passed to both the expander 16 and the pressure regulator 30 via the valve 14. The expander 16 may still cause the first shaft to rotate to some degree whereby the torque generated with the expander 16 may be increased due to the mechanical assist provided by the motor 18. The motor 18 increases the torque output of the first shaft thereby driving the compressor/blower 20 to the desired speed.

Figure 2:
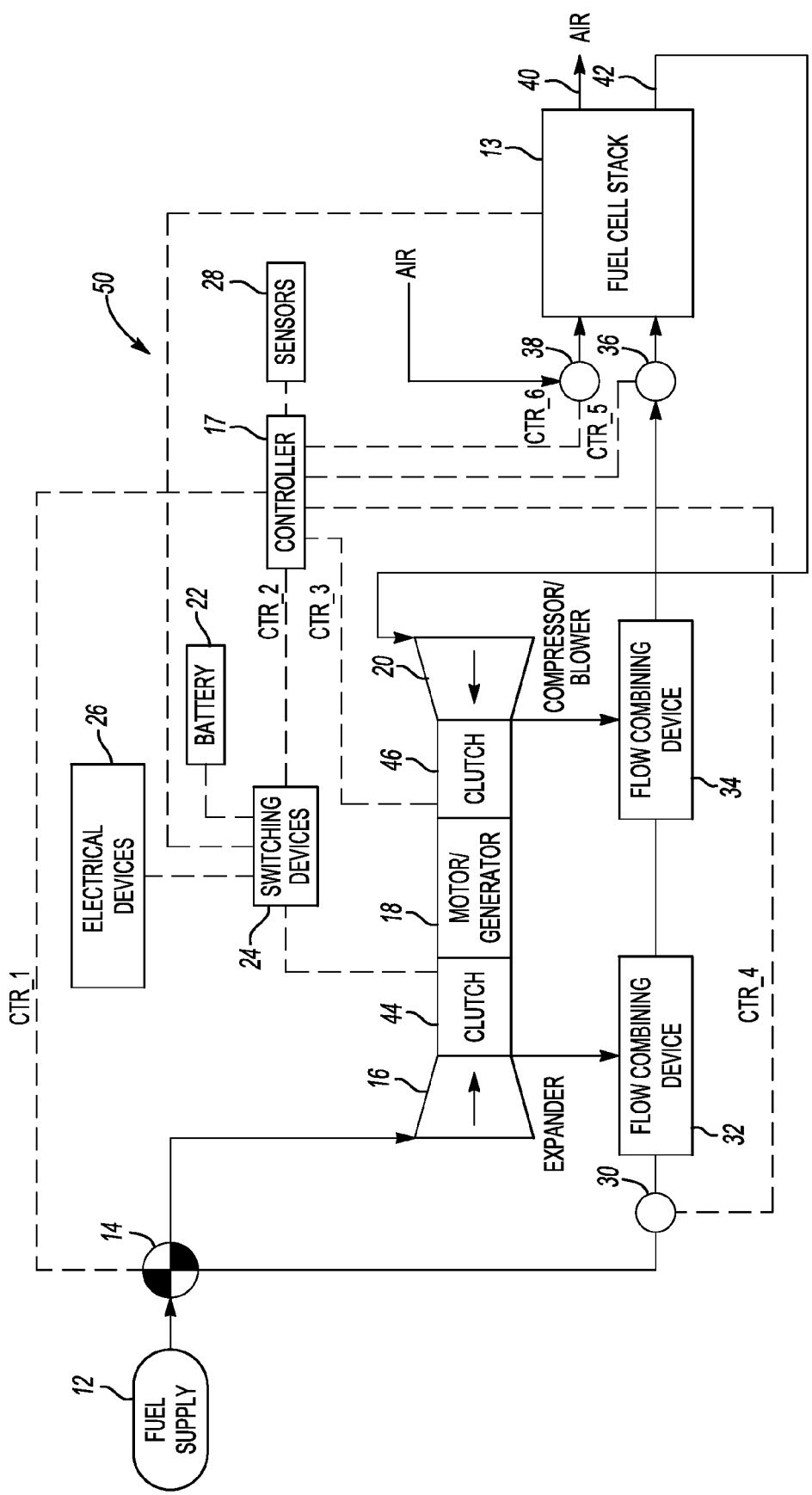
FIG. 2 depicts a second recirculation system in accordance to another embodiment of the present invention.

FIG. 2 depicts a second recirculation system 50 in the vehicle in accordance to another embodiment of the present invention. The system 50 includes a first clutch 44 coupled between the expander 16 and the motor/generator 18. The system 50 also includes a second clutch 46 coupled between the motor/generator 18 and the compressor/blower 20. The first clutch 44 may be selectively disconnected from the expander 16 and the motor/generator 18 in response to control signals from the controller 17. The second clutch 46 may be selectively disconnected from the motor/generator 18 and the compressor/blower 20 in response to control signals from the controller 17. When the expander 16 and the compressor/blower 20 are mechanically coupled together via the first and second clutches 44, 46; the rotation or torque produced by the expander 16 drives the compressor/blower 20.

The system 50 is generally implemented in a similar fashion with respect to the first, second and third modes as described in connection with system 10. There is no impact with respect to the first and second clutches 44, 46 and the interconnections of the clutches between the expander 16, the motor/generator 18 and the compressor/blower 20 when the system 50 operates in the first, second or third modes.

In a fourth mode, the controller may determine that there may not be any potential energy from the supply hydrogen for the expander 16 to capture since the pressure of the supply hydrogen in the fuel supply 12 may be low. However, in the fourth mode, the compressor/blower 20 may need to recirculate the unused hydrogen to/from the fuel cell stack 13. Such a condition may exist if the vehicle is in a low idle mode or other vehicle operating mode that creates the situation whereby the fuel cell stack 13 outputs the unused hydrogen at a low flow rate or at a low pressure. In one example, the pressure of the supply hydrogen in the fuel supply 12 may be low if the vehicle is driven and the fuel supply 12 is depleted. The pressure of the hydrogen throughout the system 50 may be low in this condition.

The controller 17 monitors the pressure level of the hydrogen in the system with the sensors 28. When the pressure of the hydrogen falls below a predetermined level, the controller 17 transmits the control signal CTR_1 to the valve 14 such that the valve 14 diverts the supply hydrogen from being delivered to the expander 16. The valve 14 diverts the entire flow of the supply hydrogen to the first pressure regulator 30. The system 50 diverts the supply hydrogen from the expander 16 to ensure that the pressure of the supply hydrogen entering the system 50 is sufficient for optimal performance of the fuel cell stack 13.

In the fourth mode, the controller 17 transmits the signal CTR_2 to the switching device 24 to allow the motor/generator 18 to receive power from the battery 22 or the fuel cell stack 13. The motor/generator 18 operates as a motor and drives the compressor/blower 20 to increase the flow rate of the unused hydrogen to/from the fuel cell stack 13. The controller 17 disconnects the first clutch 44 between the expander 16 and the motor/generator 18 to separate the compressor/blower 20 from the expander 16. The motor/generator 18 provides torque for driving the compressor/blower 20.

The system 50 may operate in a fifth mode, where the controller 17 may determine that no energy is needed to drive the compressor/blower 20 (e.g., recirculation of the unused hydrogen may not be needed in such a case). In the fifth mode, the fuel cell stack 13 may be taking in a greater amount of input hydrogen and discharging the unused hydrogen at a higher flow and pressure rate. Such a case may correspond to a vehicle operating attribute which includes the vehicle operating at high speed. The fuel cell stack 13 may discharge the unused hydrogen at a high flow rate thereby obviating the need for the compressor/blower 20 to increase the flow rate of the unused hydrogen to the fuel cell stack 13. The unused hydrogen may be recirculated back to the fuel cell stack 13 by passing the unused hydrogen out of the outlet 42, through the compressor/blower 20, the flow-combining device 34 and the first pressure regulator 36 without having to drive the compressor/blower 20 with mechanical or electrical energy. In such a case, the blower 20 may be decoupled from the motor/generator 18 via the clutch 46. There may also be a possible loss of hydrogen in the system 50 due to the flow of hydrogen through the blower.

In the fifth mode, the expander 16 and the motor/generator 18 may be coupled together via the first clutch 44. The controller 17 may disengage the second clutch 46 from the compressor/blower 20 in response to the controller 17 determining that no energy is needed to drive the compressor/blower 20. However, the expander 16 and the motor/generator 18 may be coupled together via the first clutch so that any electrical power recovered in response to the expander 16 recovering potential energy from the supply hydrogen may be used by the electrical devices 26 and/or stored on the battery 22. In this case, the controller 17 controls the generator 18 to generate electrical energy in response to the torque (e.g., torque generated by the expander 16) and controls the switching device 24 to allow electrical power to pass to the electrical devices 26 and/or the battery 22.

Figure 3:
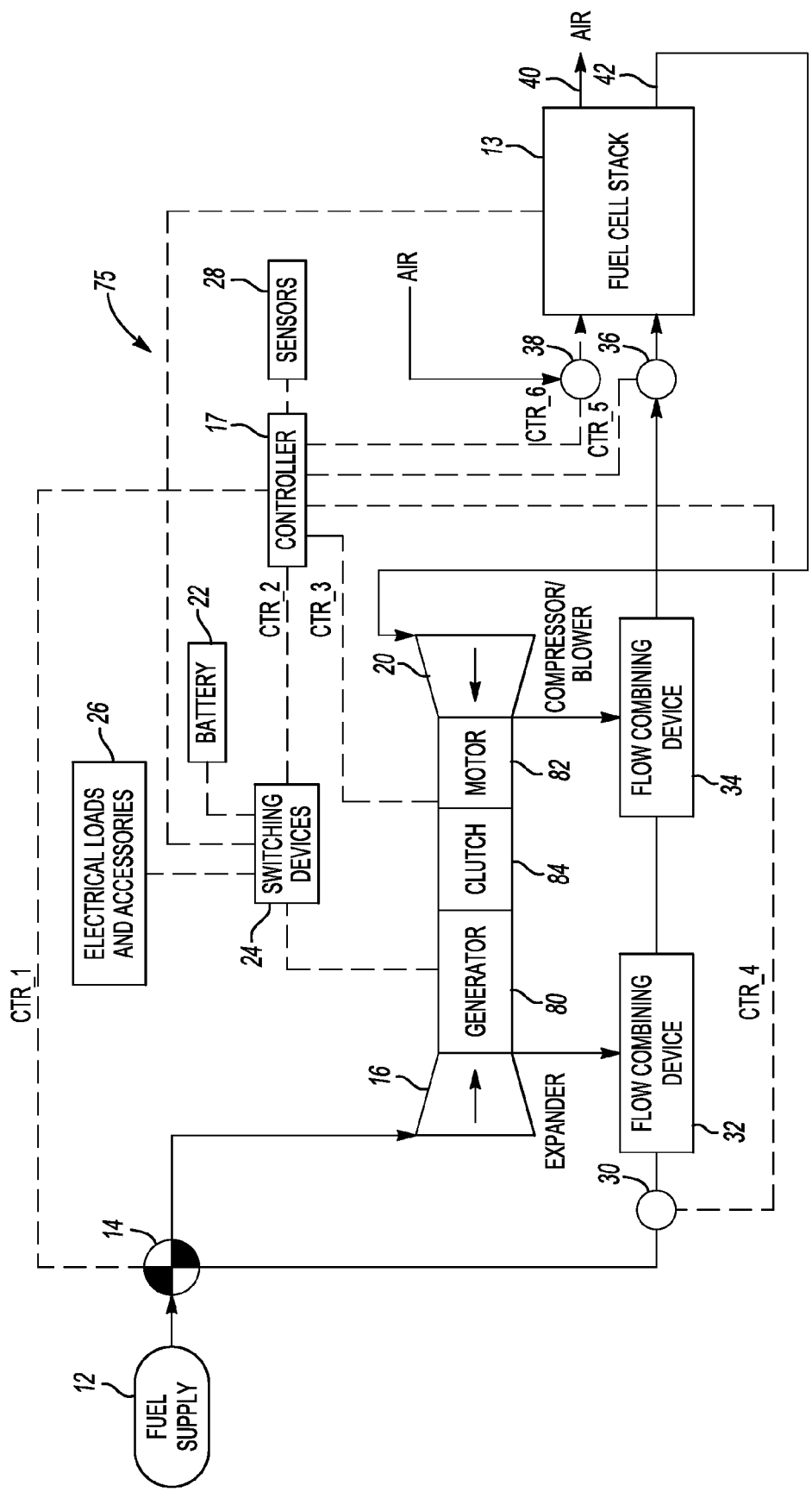
FIG. 3 depicts a third recirculation system in accordance to another embodiment of the present invention.

FIG. 3 depicts a second recirculation system 75 in the vehicle in accordance to another embodiment of the present invention. The system 75 includes a generator 80 and a motor 82. A clutch 84 is coupled between the generator 80 and the motor 82 for mechanically linking the generator 80 and the motor 82 together. The clutch 75 may be selectively connected/disconnected from the generator 80 and the motor 82 in response to control signals from the controller 17.

While the clutch 84 is connected to the expander 16, the generator 80 and the motor 82 may generate torque in response to converting potential energy from the supply hydrogen. The generator 80 generates electrical power in response to the torque. The expander 16 may also drive the motor 82 with the torque. The motor 82 may drive the compressor/blower 20 in response to the torque.

The system 75 is generally implemented in a similar fashion with respect to the first, second, and third modes as described in connection with the system 10. The third clutch 84 is configured to stay connected to the generator 80 and the motor 82 as the system 75 operates in the first, second and third modes. With respect to the fourth mode, the system 75 may disconnect the clutch 84 between the generator 80 and the motor 82 so that the motor 82 drives the compressor/blower 20 with electrical energy stored on the battery 22 with electrical power from the fuel cell stack 13. As noted in connection with FIG. 2, the valve 14 may be controlled to divert the supply hydrogen to the first pressure regulator 30 in response to the control signal CTR_1 to prevent the supply hydrogen from being delivered to the expander 16 when the supply hydrogen is at a low pressure state.

With respect to the fifth mode, the compressor/blower 20 is disconnected from the motor 82 via the clutch 84 as the compressor/blower 20 may not need to increase the flow rate of the unused hydrogen back to the fuel cell stack 13.

In a sixth mode, the controller 17 may determine that the system 75 can recover potential energy to drive the compressor/blower 20 but that a speed differential may be needed between the expander 16 and the compressor/blower 20 for optimal performance. In general, the speed of the blower 20 may need to vary in a manner that does not directly match the speed of the expander 16. To vary the speed of the blower 20 with respect to the blower 20, the controller 17 may decouple the expander 16 from the compressor/blower 20 via the clutch 84 to allow the expander 16 and the compressor/blower 20 to operate at different speeds. The expander 16 is connected to the generator 80 and the generator 80 creates electrical energy in response to the torque produced by the expander 16. The electrical energy may be passed through the switching device 24 and to the battery 22 for storage or to the electrical devices 26 and the motor 82 for consumption. As the generator 80 generates electrical power for storage on the battery 22, the motor 82 simultaneously drives the compressor/blower 20 with the electrical energy stored on the battery 22. The variable speed differential created between the expander 16 and the compressor/blower 20 may be needed for optimal performance of the fuel cell stack 13. In one example, one or more gears may be used in place of the clutch 84 to change the speed of the blower 20 relative to the speed of the expander 16. However, such an implementation may provide a fixed speed ratio and may or may not be optimal. In general, the selection of using the clutch 84 or the gears may be varied to meet the desired criteria of a particular implementation. All references to hydrogen as noted herein generally includes hydrogen-rich gases such as reformates. In addition, the oxygen in the airstream may include various types of oxygen generated by oxygen enrichment methods.

While the best mode for carrying out the invention has been described in detail, those familiar with the art to which this invention relates will recognize various alternative designs and embodiments for practicing the invention as defined by the following claims.

What is claimed:

1. A system for recirculating an unused hydrogen stream to a fuel cell stack, the system comprising:
   a fuel supply adapted to provide a pressurized supply hydrogen stream;
   an expander in fluid communication with the fuel supply and configured to receive the pressurized supply hydrogen stream, to reduce pressure of the pressurized supply hydrogen stream, to produce a reduced pressure hydrogen stream, and to generate mechanical energy in response to reducing the pressure of the pressurized supply hydrogen stream;
   an electric machine operably coupled to the expander and for selectively converting the mechanical energy generated by the expander into electrical energy;
   a compressor/blower capable of being driven by at least one of the mechanical energy and the electrical energy to control the flow of the unused hydrogen stream;
   at least one flow-combining device in fluid communication with the expander and the compressor/blower for combining the unused hydrogen stream with the reduced pressure supply hydrogen stream to produce an input hydrogen stream; and
   the fuel cell stack being in fluid communication with the flow-combining device and the compressor/blower to receive the input hydrogen stream from the flow-combining device and an air stream, to generate electrical power for a vehicle in response to the air stream and the input hydrogen stream, and to provide the unused hydrogen stream to the compressor/blower.

2. A recirculation system in a vehicle comprising:
   a fuel cell stack being configured to receive an input fluid stream for generating electrical power and to generate an unused fluid stream;
   a fuel supply adapted to provide a pressurized supply fluid stream;
   an expander in fluid communication with the fuel supply and configured to receive a first portion of the pressurized supply fluid stream to reduce the pressure of the first portion of pressurized supply fluid stream and to generate mechanical energy in response to reducing the first portion of the pressurized supply fluid stream;
   an electric machine operably coupled to the expander and being configured to selectively convert at least a portion of the mechanical energy into electrical energy;
   a compressor/blower capable of being driven by at least one of the mechanical energy and the electrical energy to deliver the unused fluid stream to the fuel cell stack; and
   a controller being operably coupled to the electrical machine and being configured to disable the electric machine such that the compressor/blower is driven by the mechanical energy for recirculating the unused fluid stream to the fuel cell stack when the vehicle is in a first state.

3. The system of claim 2 wherein the first state corresponds to the vehicle being in a low power consumption mode.

4. The system of claim 2 wherein the controller is further configured to enable the electric machine to generate the electrical energy for storage on a battery when the vehicle is detected to be in a second state, wherein the compressor/blower is driven by the mechanical energy for recirculating the unused fluid stream to the fuel cell stack when the vehicle is in the second state.

5. The recirculation system of claim 4 wherein the second state corresponds to the vehicle being in a high power consumption mode.

6. The recirculation system of claim 2 further comprising a flow combining device being operably coupled to the compressor/blower for combining the unused fluid stream being discharged from the compressor/blower with a second portion of the pressurized fluid stream to form the input fluid stream that is delivered to the fuel cell stack.

7. A recirculation system in a vehicle comprising:
   a fuel cell stack being configured to receive an input fluid stream for generating electrical power and to generate an unused fluid stream;
   a fuel supply adapted to provide a pressurized supply fluid stream;
   an expander in fluid communication with the fuel supply and configured to receive a first portion of the pressurized supply fluid stream to reduce the pressure of the first portion of pressurized supply fluid stream and to generate mechanical energy in response to reducing the first portion of the pressurized supply fluid stream;
   an electric machine operably coupled to the expander and being configured to selectively convert at least a portion of the mechanical energy into electrical energy;
   a compressor/blower capable of being driven by at least one of the mechanical energy and the electrical energy to deliver the unused fluid stream to the fuel cell stack; and
   a flow combining device in fluid communication with the compressor/blower for combining the unused fluid stream being discharged from the compressor/blower with a second portion of the pressurized fluid stream to form the input fluid stream that is delivered to the fuel cell stack.

8. The recirculation system of claim 7 further comprising a controller being operably coupled to the electrical machine and being configured to disable the electric machine such that the compressor/blower is driven by the mechanical energy for delivering the unused fluid stream to the fuel cell stack when the vehicle is in a first state.

9. The recirculation system of claim 8 wherein the first state corresponds to the vehicle being in a low power consumption mode.

10. The recirculation system of claim 8 wherein the controller is further configured to enable the electric machine to generate the electrical energy for storage on a battery when the vehicle is detected to be in a second state, wherein the compressor/blower is driven by the mechanical energy for delivering the unused fluid stream to the fuel cell stack when the vehicle is in the second state.

11. The recirculation system of claim 10 wherein the second state corresponds to the vehicle being in a high power consumption mode.

12. The system of claim 7 further comprising a battery and a plurality of electrical devices operably coupled to the electrical machine and a controller being configured to control the electrical machine to selectively store electrical power in the battery or to selectively source electrical power to the electrical devices in response to the mechanical energy.

13. The system of claim 7 further comprising a battery operably coupled to the compressor/blower, wherein the compressor/blower consumes electrical power from at least one of the battery and the fuel cell stack when a measured amount of pressure of the supply fluid in the fuel supply is below a predetermined pressure level to deliver the flow of the unused fluid stream to the fuel cell stack.

* * * * *